United States Patent [19]

Hayashibara

[11] Patent Number: 4,487,254

[45] Date of Patent: Dec. 11, 1984

[54] TEMPERATURE CONTROL UNIT FOR VEHICULAR AIR CONDITIONING UNIT

[75] Inventor: Toshio Hayashibara, Katsuta, Japan

[73] Assignee: Hitachi, Ltd., Tokyo, Japan

[21] Appl. No.: 484,223

[22] Filed: Apr. 12, 1983

[30] Foreign Application Priority Data

Apr. 16, 1982 [JP] Japan .................. 57-62313

[51] Int. Cl.³ .................. F25B 29/00; F28F 27/00
[52] U.S. Cl. .................. 165/16; 165/12; 165/42; 236/49
[58] Field of Search .................. 236/49; 165/42, 43, 165/12, 14, 16, 25, 26, 36

[56] References Cited

U.S. PATENT DOCUMENTS

| | | | |
|---|---|---|---|
| 3,820,590 | 6/1974 | Littman | 165/26 |
| 4,344,565 | 8/1982 | Kojima et al. | 165/12 |
| 4,345,714 | 8/1982 | Kojima | 165/12 |
| 4,358,050 | 11/1982 | Naganoma et al. | 165/42 |
| 4,422,571 | 12/1983 | Bowman | 236/49 |

FOREIGN PATENT DOCUMENTS

| | | | |
|---|---|---|---|
| 31654 | 3/1980 | Japan | 165/43 |
| 2019046 | 10/1979 | United Kingdom | 236/49 |

*Primary Examiner*—William R. Cline
*Assistant Examiner*—Edward P. Walker
*Attorney, Agent, or Firm*—Antonelli, Terry & Wands

[57] ABSTRACT

In a temperature control unit for a vehicular air conditioning unit including a blast unit and control for the blowoff temperature thereof, a control circuit is provided with a variable gain so that the gain is increased when the blast unit blows air with a high velocity and is decreased when the blast unit blows air with a low velocity whereby a temperature control which does not cause discomfort to a human body may be carried out promptly and automatically. The variable gain of the control circuit may be provided in the form of a feedback loop of the control circuit with at least one of variable resistance or capacitance so as to vary the time constant of the feedback loop and therewith the gain in accordance with the air velocity.

20 Claims, 12 Drawing Figures

$R_{L1}$  $R_{L2}$  $R_{L3}$  FS CONTACTS $S_1$  $S_2$  $S_3$  CONTACTS IN CONDUCTION $C_1 < C_2 < C_3$  CAPACITANCE VALUE OF CAPACITOR $AS_3$ | $AS_2$ | $AS_1$  SWITCHES IN CONDUCTION $C_3 > C_2 > C_1$  CAPACITANCE VALUE OF CAPACITOR

| | | | |
|---|---|---|---|
| $R_{L1}$ | $R_{L2}$ | $R_{L3}$ | FS CONTACT |
| $S_1$ | $S_2$ | $S_3$ | CONTACT IN CONDUCTION |
| $R_{11} >$ | $R_{12} >$ | $R_{13}$ | RESISTANCE VALUE |

TEMPERATURE CONTROL UNIT FOR VEHICULAR AIR CONDITIONING UNIT

The present invention relates to a temperature control unit for a vehicular air conditioning unit and in particular to a temperature control unit which is suitable for blowoff temperature control.

FIG. 1 shows the general construction of a conventional vehicular air conditioning unit. In FIG. 1, the wind or air fed from a blast unit 1 is cooled in an evaporator 2 and then heated in a heater 3. At this time, the distribution ratio between wind $W_1$ which passes through the heater 3 and wind $W_2$ which does not pass through the heater 3 is varied according to the position of an air mix door 4 (hereafter referred to as A/M door). As a result, the temperature of the wind is varied. A sensor 5 is provided for detecting the temperature Tr of the wind blown off from the blowoff hole or duct into the passenger compartment. The detected temperature Tr is compared with the set temperature Ts preset by a temperature setting variable resistor 7 in a control circuit 6 to drive the A/M door 4.

FIG. 2 shows the circuit configuration of the control circuit 6 illustrated in FIG. 1. In FIG. 2, the sensor 5 is connected in series with a resistor $R_1$ to send out the voltage at the point coupling them as the blowoff temperature signal. The sensor 5 is composed of a thermistor having the resistance value varied according to the temperature. As the temperature in the compartment rises, the resistance value of the sensor 5 is decreased. Accordingly, the voltage division ratio defined by the sensor 5 and the resistor $R_1$ is decreased. As a result, the output voltage of the blowoff temperature signal is lowered. As the temperature in the compartment is lowered, the resistance value of the sensor 5 is increased. Because of an increased voltage division ratio, the output voltage of the blowoff temperature signal is raised.

This blowoff temperature signal $T_R$ and the preset blowoff temperature value $T_S$ which has been set by the temperature setting variable resistor 7 are applied to an amplifier OP. Resistors $R_2$, $R_3$ and $R_4$ define the gain distribution during operation. The voltage E is the reference voltage during operation. The signal resulting from the operation in the amplifier is fed to an A/M door drive circuit 8 to drive the A/M door 4. A capacitor $C_1$ is connected in parallel with the resistor $R_4$ to define the time constant of a negative feedback circuit which determines the loop gain of the control circuit 6.

Representing the output voltage of the temperature setting variable resistor 7 as $V_1$, the output voltage of the sensor 5 as $V_2$, and the output voltage of the amplifier OP as $V_{out}$, we have the following result:

$$V_{out} = E - \left\{ (V_1 - E) \times \frac{R_4'}{R_2} + (V_2 - E) \times \frac{R_4'}{R_3} \right\} \quad (1)$$

where $$R_4' = \frac{R_4 \times \frac{1}{j\omega C_1}}{R_4 + \frac{1}{j\omega C_1}} = \frac{R_4}{1 + j\omega C_1 R_4} \quad (2)$$

Letting $R_4 = K_1$ $j\omega = S$ $C_1 \cdot R_4 = Ta$

The equation (2) may be rewritten as $$R_4' = \frac{R_4}{1 + j\omega C_1 R_4} = \frac{K_1}{1 + STa} \quad (3)$$

That is to say, $R_4'$ represents the frequency response of the first delay element in the automatic control.

FIG. 3 represents the drive loop for the A/M door 4 illustrated in FIG. 2 by using transfer functions. The blowoff temperature $T_R$ is fed back from the sensor 5 to a subtracter with a gain of $K_2$. The blowoff temperature $T_R$ is subtracted from the preset temperature $T_S$. The resultant error signal $\Delta T = T_S - T_R$ is amplified with the gain $K_1/(1+STa)$ of the operation circuit including the gain of the A/M door drive circuit 8 as expressed by the equation (3). Due to the operation of the A/M door 4, the blowoff temperature is varied. Since the wind or air from the A/M door 4 is distributed by a duct in the compartment and then blown off, however, it takes a delay time Ta for the wind to reach the sensor 5 for detecting the blowoff temperature. The blowoff temperature $T_R$ is obtained as the output of this delayed represented as exp$(-TdS)$.

FIG. 4 shows a Bode diagram for the control loop of the A/M door 4 illustrated in FIG. 2.

Due to the presence of the capacitor $C_1$ for changing the time constant of the negative feedback circuit, the loop gain falls down at higher frequencies. The phase angle varies significantly according to the delay time Td.

As the wind speed decreases, the delay time increases, resulting in the phase angle designated as "low wind velocity" in FIG. 4.

For stabilizing this control system, the gain at a point where the phase angle is $-180°$, must be below 0 dB. The delay time Td is varied according to the velocity of the wind blown off from the blast unit 1.

That is to say, the loop gain must be positioned to the left side of a line designated as $\alpha$ in order to attain any stability even for the low wind velocity. This condition is necessary for the case of high wind velocity. As a result, an excessively small gain has been preset apart from the left side vicinity of a line $\beta$. Therefore, the response speed is lowered for the high wind velocity. That is to say, the speed in responding to the variation of preset temperature or variation due to an external disturbance is lowered. In the high wind velocity, the sensory nerve of a human body becomes sharper than that in the low wind velocity. Accordingly, the decrease in the velocity might cause passenger discomfort.

The prior art has presented the above described drawbacks.

The present invention eliminates the above described various drawbacks.

An object of the present invention is to provide a temperature control unit wherein the gain of a control circuit is increased when the blast unit runs to blow off the air of high velocity and the gain of the control circuit is decreased when the blast unit runs to blow off the air of low velocity so that the passenger does not experience discomfort whether the wind velocity be high or low.

Another object of the present invention is to enhance the response speed of the control system by increasing or decreasing the loop gain according to high or low wind velocity.

Embodiments of the present invention will hereafter be described referring to drawings.

Hereafter, a temperature control unit for the vehicular air conditioning unit according to the present invention will be described in detail referring to embodiments.

Figure 5:
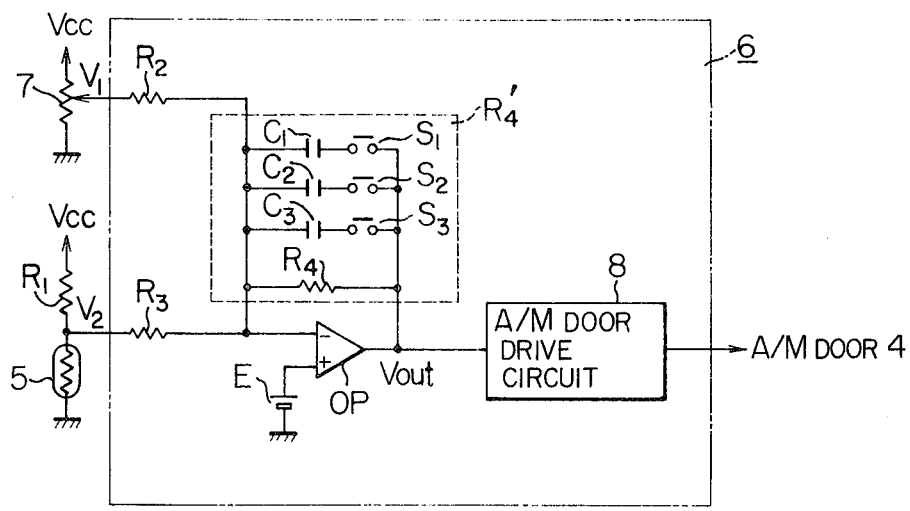
FIG. 5 shows the circuit configuration of the first embodiment of a temperature control unit for a vehicular air conditioning unit according to the present invention.
Figure 5:
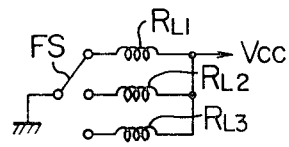

FIG. 5 shows the circuit configuration of the first embodiment of the present invention.

Figure 2:
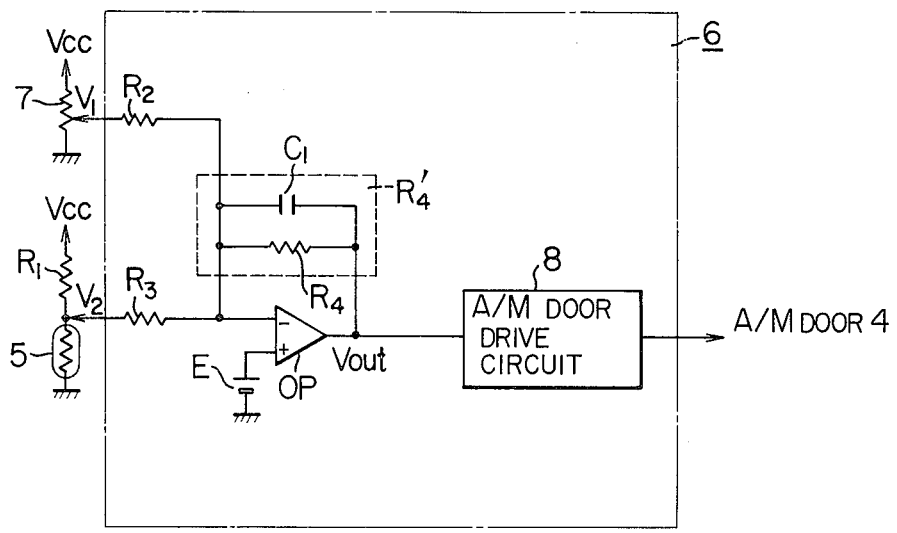
FIG. 2 shows the circuit configuration of the control circuit illustrated in FIG. 1.
Figure 3:
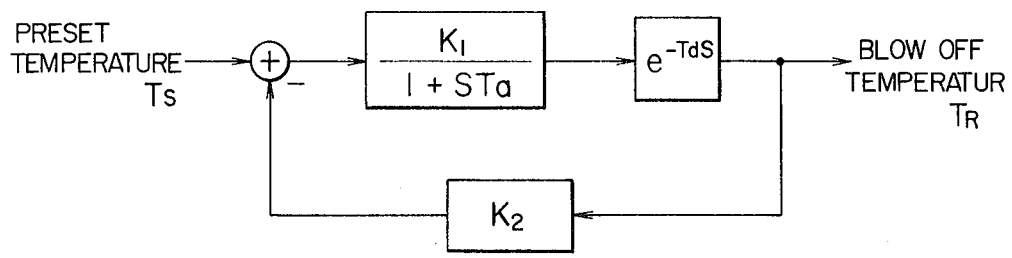
FIG. 3 shows transfer functions included in the loop for driving the A/M door illustrated in FIG. 2.

In FIG. 5, the same numerals as those in FIG. 2 denote the same components as those in FIG. 2.

Signals fed from a sensor 5 and a temperature setting variable resistor 7 are detected by a detection unit composed of a fan switch FS and relay windings $R_{L1}$ to $R_{L3}$ which are selectively controlled by the fan switch FS. As detailed in the description of the prior art, the detected signals are subjected to operation in the control circuit 6.

Instead of a single capacitor $C_1$ in the prior art illustrated in FIG. 2, a plurality of capacitors $C_1$ to $C_3$ which can be selected by switches $S_1$ to $S_3$ are provided so that the time constant of the negative feedback circuit for defining the gain of the loop included in the control circuit 6 may be arbitrarily changed.

It is possible to selectively turn one of the switches $S_1$ to $S_3$ into the conduction state by selecting one of relay windings $R_{L1}$ to $R_{L3}$ with the fan switch FS.

That is to say, one relay winding energized among the relay windings $R_{L1}$ to $R_{L3}$ selects one of a plurality of capacitors $C_1$ to $C_3$ so that the time constant of the negative feedback circuit for defining the loop gain of the control circuit 6 may be changed.

In FIG. 5, there is no problem even in a transition state during which the relay windings $R_{L1}$ to $R_{L3}$ are changed over by the fan switch FS owing to the instantaneous changeover.

Figure 6:
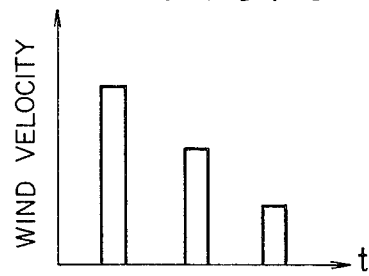
FIG. 6 shows the operations of switches illustrated in FIG. 5.

FIG. 6 shows the changeover operations of the switches $S_1$ to $S_3$ illustrated in FIG. 5. As the wind or air velocity is decreased, the capacitors $C_1$ to $C_3$ are successively selected to increase the capacitance value.

Figure 4:
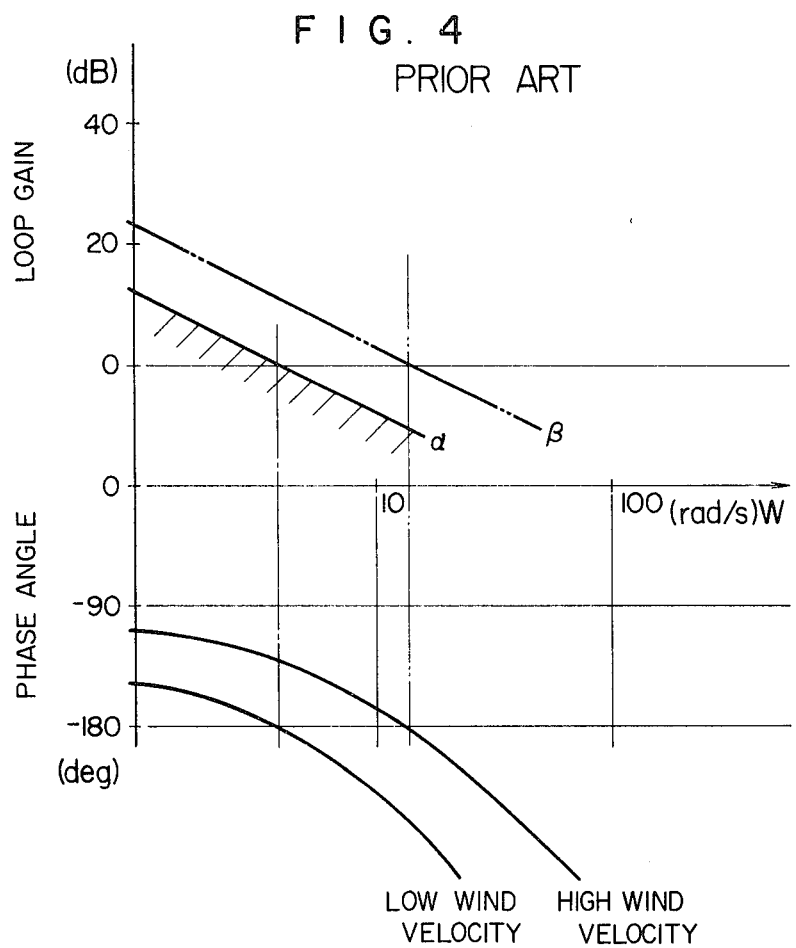
FIG. 4 shows the Bode diagram of the control loop for the A/M door illustrated in FIG. 2.

As a result, the cutoff frequency of the amplifier OP is lowered and the loop gain shown in FIG. 4 changes from the line $\beta$ to the line $\alpha$ by stages.

Owing to this operation, a control system having a large gain represented by $\beta$ is realized for a high wind velocity and a control system satisfying the stability requirement represented by $\alpha$ is realized for a low wind velocity. Thereby, discomfort to a human body which has been described referring to the prior art can be prevented, resulting in a temperature control unit which effects comfortable blowoff temperature control.

Figure 1:
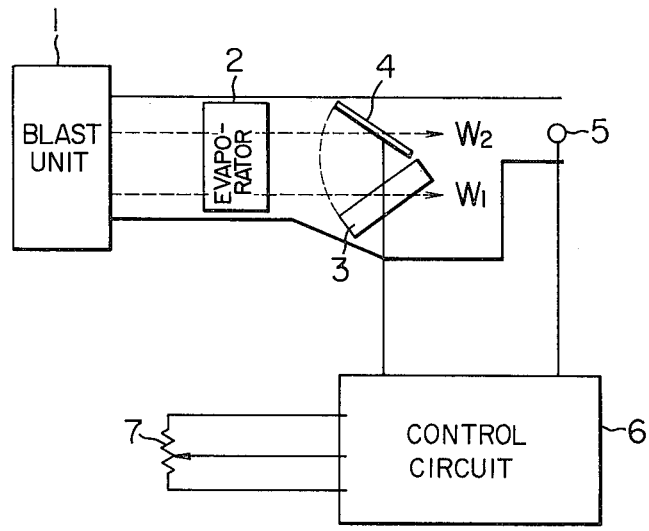
FIG. 1 shows the configuration of a conventional temperature control unit for a vehicular air conditioning unit.
Figure 7:
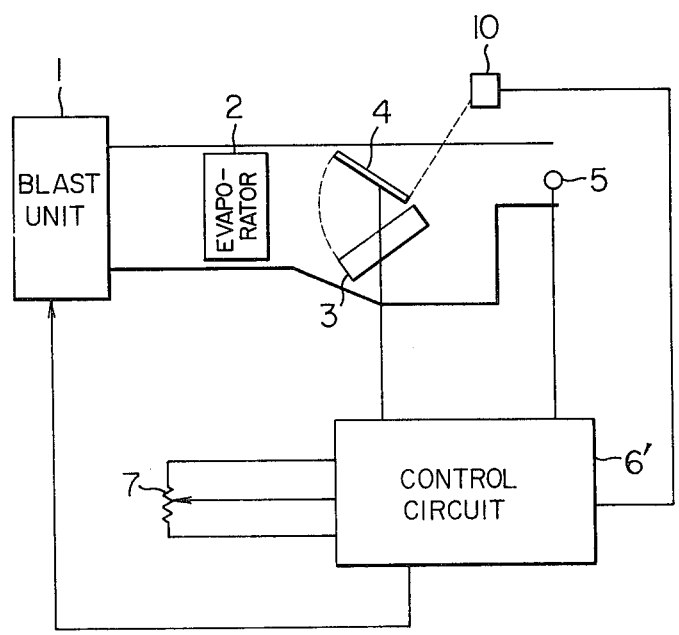
FIG. 7 shows the configuration of the second embodiment according to the present invention.

FIG. 7 shows the configuration for the second embodiment of the present invention. In FIG. 7, the same numerals as those in FIG. 1 denote the same components. In this embodiment, the wind velocity is not changed by stages by the fan switch FS as shown in FIG. 5, but is continuously changed. The opening degree ($\theta$) of the A/M door 4 is detected by a potentiometer 10. According to the opening degree ($\theta$) of the A/M door 4, the control circuit 6' controls the wind velocity of the blast unit 1.

Figure 8:
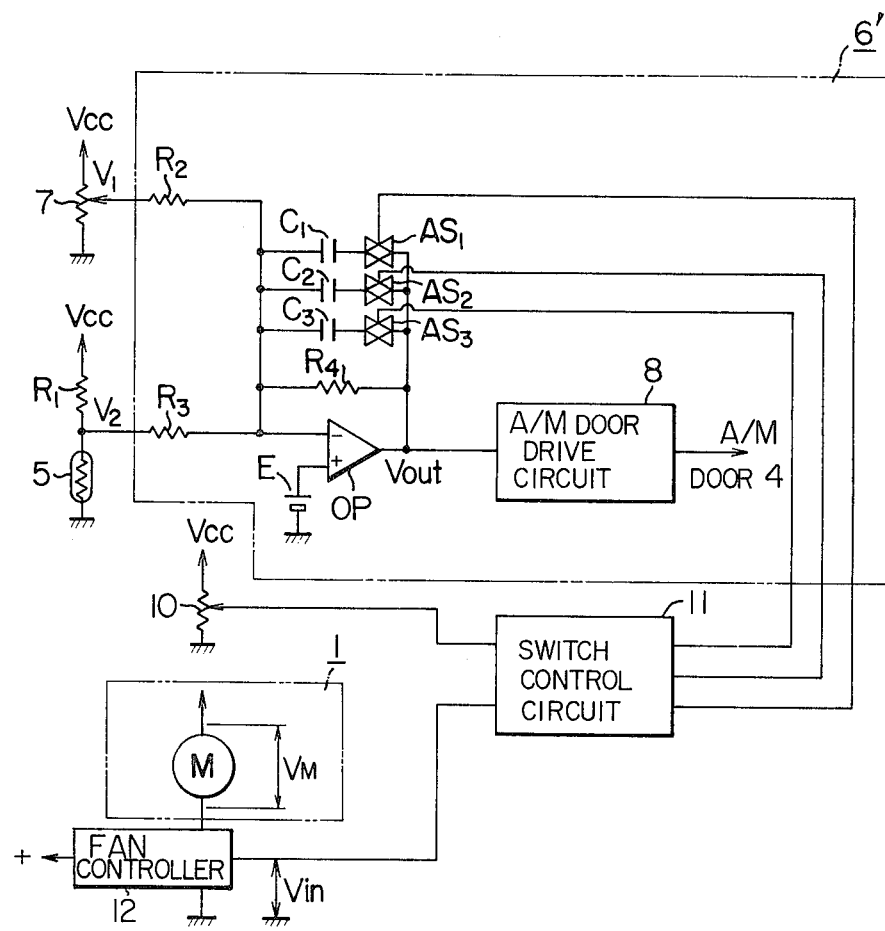
FIG. 8 shows the circuit configuration of the control circuit illustrated in FIG. 7.

FIG. 8 shows the circuit configuration of the control circuit 6' illustrated in FIG. 7. In FIG. 8, the same numerals as those in FIG. 6 denote the same components. Further in FIG. 8, the potentiometer 10, a switch control circuit 11 and a fan controller 12 are added to the circuit illustrated in FIG. 6. A motor M is contained within the blast unit 1. Rotation of the motor M blasts air.

Further, mechanical switches $S_1$ to $S_3$ illustrated in FIG. 6 have been replaced by electronic analog switches $AS_1$ to $AS_3$, respectively.

Figure 9A:
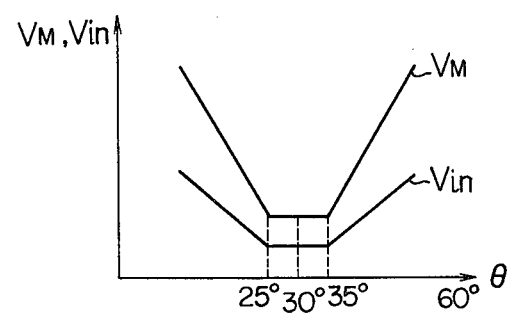
FIG. 9A and FIG. 9B show voltage characteristics of the circuit illustrated in FIG. 8.
Figure 9B:
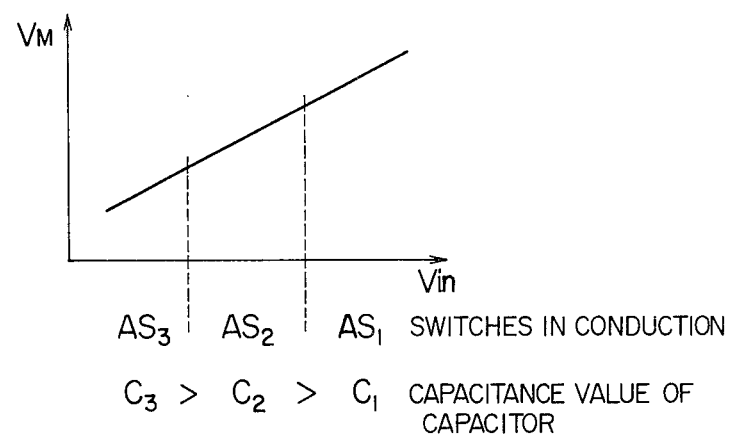

FIG. 9A and FIG. 9B illustrate the relationship between the voltage $V_M$ applied to the motor M illustrated in FIG. 8 and the signal voltage $V_{in}$ applied from the switch control circuit 11 to the fan controller 12.

FIG. 9A shows the applied voltage $V_M$ and the signal voltage $V_{in}$ as functions of the opening degree ($\theta$) of the A/M door 4.

FIG. 9B shows the applied voltage $V_M$ as the function of the signal voltage $V_{in}$ when one of analog switches $AS_1$ to $AS_3$ is successively selected in FIG. 8.

As the opening degree ($\theta$) of the A/M door 4 is increased, both the applied voltage $V_M$ and the signal voltage $V_{in}$ vary in the sequence of "decrease→constant→increase" as shown in FIG. 9A. At a value of the opening degree ($\theta$) corresponding to the middle position of the A/M door (4), the wind $W_1$ passing through the heater 3 and the wind $W_2$ which does not pass through the heater 3 are mixed at the equal rate. Therefore, the wind quantity has been made to decrease by the reason of the noise or the like.

In FIG. 8, the fan controller 12 is provided for amplifying the signal voltage $V_{in}$ fed from the switch control circuit 11 to produce the voltage $V_M$ to be applied to the motor M. The fan controller 12 simply carries out proportional amplification.

Assuming that the signal voltage $V_{in}$ is increased, the applied voltage $V_M$ is also increased. Because of an increased rpm of the motor M, the wind velocity is also increased. As shown in FIG. 9B, the analog switches $AS_3$ to $AS_1$ are successively turned on to decrease the capacitance value of the capacitor connected in parallel with the resistor $R_4$ in the sequence of the capacitors $C_3$, $C_2$ and $C_1$. This relationship is the same as that shown in FIG. 6.

Owing to the above described configuration illustrated in FIG. 8, it is possible to continuously change the wind by the fan controller 12. In addition to this advantage, the number of the analog switches AS can be easily increased whereas the number of contacts is restricted in case of the fan switch FS. In the switch control circuit 11 illustrated in FIG. 8, the magnitude of the signal voltage $V_{in}$ is discriminated to changeover the analog switches AS. By effecting the discrimination more precisely, the number of the analog switches AS can be increased. On the contrary, the fan switch FS usually has only 3 or 4 contacts. Accordingly, it is only permitted to provide switches corresponding to 3 or 4 contacts. Further, owing to use of analog switches AS instead of mechanical switches S, the circuit configuration illustrated in FIG. 8 brings about advantages such as space reduction and reliability improvement.

Figure 10:
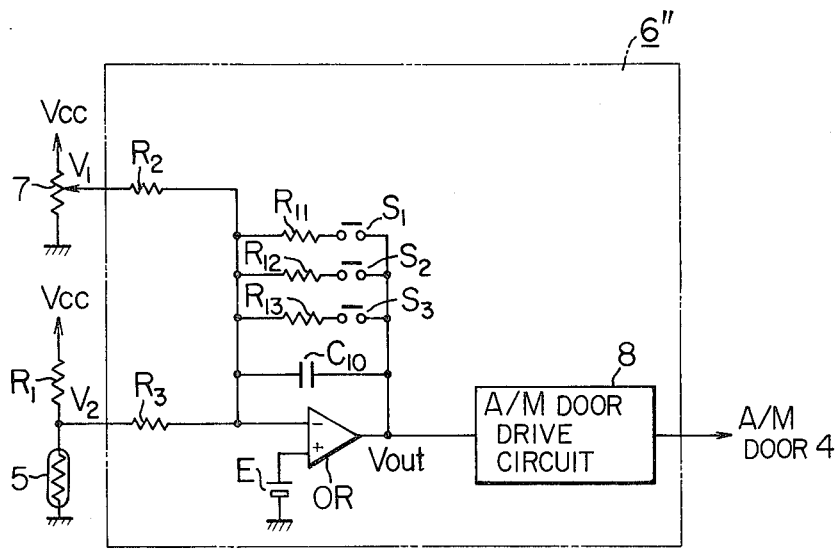
FIG. 10 shows the circuit configuration of the third embodiment of the present invention.
Figure 10:
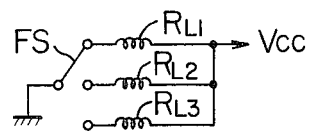

FIG. 10 shows the circuit configuration of the third embodiment of the present invention. In FIG. 10, reference numerals already used in FIG. 5 denote the same components as those in FIG. 5. In FIG. 10, the switches $S_1$ to $S_3$ change over the resistors $R_{11}$ to $R_{13}$ instead of the capacitors $C_1$ to $C_3$ as in FIG. 5. Further, a capacitor $C_{10}$ is provided instead of the resistor $R_4$.

Figure 11:
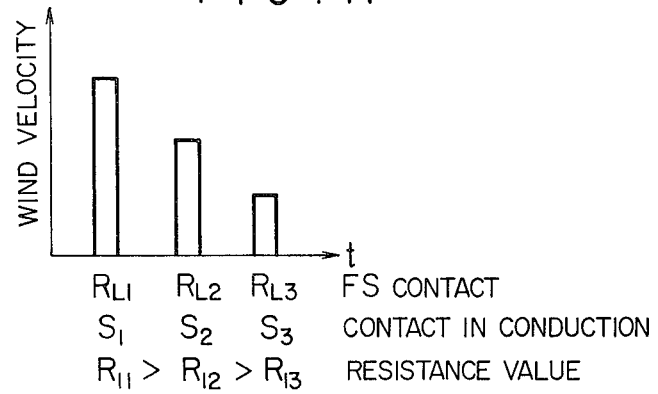
FIG. 11 shows the operations of switches illustrated in FIG. 10.

FIG. 11 shows the switching operations of the switches $S_1$ to $S_3$ in the circuit illustrated in FIG. 10. In FIG. 11, the resistance value is decreased in the sequence of the $R_{11}$, $R_{12}$ and then $R_{13}$ to decrease the gain according to decrease of the wind velocity in the same way as in FIG. 6. Since a resistor has a smaller size compared with a capacitor, the circuit illustrated in FIG. 10 is advantageous in that the space of the unit can be reduced.

In the embodiments, analog control using the amplifier OP is carried out. Instead, digital control using a microcomputer may be adopted. In that case, the gain can be adjusted by means of software.

According to the present invention, there is an advantage that it becomes possible to extremely promptly provide the wind with the blowoff temperature which is comfortable to a human body no matter whether the wind velocity is high or low.

Further, according to the present invention, there is another advantage that it becomes possible to entirely automatically provide the above described wind with comfortable blowoff temperature.

I claim:

1. A temperature control unit for a vehicular air conditioning unit comprising:
   a blast unit for blowing air with different velocities;
   an evaporator for cooling the air blown from said blast unit;
   a heater for heating said cooled air;
   an air mix door for distributing said cooled air into air to be passed through said heater and air not to be passed therethrough;
   a sensor for detecting the blowoff temperature of the air blown into the compartment; and
   a control circuit for comparing a blowoff temperature which has been detected by said sensor with a preset temperature to drive said air mix door, said control circuit being provided with a variable gain, and means for increasing the gain of said control circuit when said blast unit blows the air with a high air velocity and for decreasing the gain of said control circuit when said blast unit blows the air with a low air velocity.

2. A temperature control unit for a vehicular air conditioning unit according to claim 1, wherein the variable gain of said control circuit is provided in a control loop of said control circuit.

3. A temperature control unit for a vehicular air conditioning unit according to claim 2, wherein said control circuit includes a temperature control signal generating circuit having a negative feedback circuit with a variable time constant, said variable time constant of said negative feedback circuit in said temperature control signal generating circuit being varied according to the air velocity.

4. A temperature control unit for a vehicular air conditioning unit according to claim 3, wherein said variable time constant includes variable capacitance means, the value of said variable capacitance means being varied according to said air velocity.

5. A temperature control unit for a vehicular air conditioning unit according to claim 3, wherein said variable time constant includes variable resistance means, the value of said variable resistance means being varied according to said air velocity.

6. A temperature control unit for a vehicular air conditioning unit according to claim 2, further comprising a detection unit for detecting the running state of said blast unit, said variable gain being controlled by the output produced from said detection unit according to the rpm of said blast unit.

7. A temperature control unit for a vehicular air conditioning unit according to claim 6, wherein said detection unit comprises a fan switch and relay windings which are selectively controlled by said fan switch, said control circuit including a negative feedback circuit having a variable time constant for controlling said variable gain of said control circuit, and said variable time constant of said negative feedback circuit for controlling said variable gain being varied by said selected relay winding.

8. A temperature control unit for a vehicular air conditioning unit according to claim 7, wherein said time constant of said negative feedback circuit comprises a plurality of capacitors and one of said capacitors is selected by said fan switch.

9. A temperature control unit for a vehicular air conditioning unit according to claim 7, wherein said time constant of said negative feedback circuit comprises a plurality of resistors and one of said resistors is selected by said fan switch.

10. A temperature control unit for a vehicular air conditioning unit according to claim 6, wherein said detection unit comprises a fan controller of a motor and said output according to the rpm is fed to the input of said fan controller.

11. A temperature control unit for a vehicular air conditioning unit according to claim 2, further comprising a potentiometer for detecting an opening degree of said air mix door, the output of said potentiometer being fed to said control circuit which continuously varies the air velocity of said blast unit.

12. A temperature control unit for a vehicular air conditioning unit according to claim 2, wherein said control loop includes an amplifier having a feedback circuit, said feedback circuit having a variable time constant for controlling the variable gain of the loop and the response time of said control circuit, said variable time constant being varied in accordance with the air velocity.

13. A temperature control unit for a vehicular air conditioning unit according to claim 12, wherein said feedback circuit is a negative feedback circuit and said variable time constant is formed of a resistance means and capacitance means, at least one of the value of said resistance means and capacitance means being variable in accordance with the air velocity.

14. A temperature control unit for a vehicular air conditioning unit according to claim 13, wherein said control circuit includes a temperature control signal generating circuit having said negative feedback circuit therein.

15. A temperature control unit for a vehicular air conditioning unit according to claim 13, wherein the value of said resistance means is varied in accordance with the air velocity.

16. A temperature control unit for a vehicular air conditioning unit according to claim 15, wherein said resistance means comprises a plurality of resistors, one of said resistors being selected in accordance with the air velocity for varying said time constant.

17. A temperature control unit for a vehicular air conditioning unit according to claim 13, wherein said capacitance means is varied in accordance with the air velocity.

18. A temperature control unit for a vehicular air conditioning unit according to claim 17, wherein said capacitance means comprises a plurality of capacitors, one of said capacitors being selected in accordance with the air velocity for varying said time constant.

19. A temperature control unit for a vehicular air conditioning unit comprising:

means for blowing air with different velocities;
means for cooling the air blown from said blowing means;
means for heating the cooled air;
means for distributing the cooled air into air to be passed through the heating means and air not to be passed through the heating means;
sensing means for detecting the blowoff temperature of the air blown into a compartment of the vehicle; and
control circuit means for comparing a blowoff temperature detected by the sensing means with a preset temperature for controlling the air distributing means, the control circuit means being provided with a variable gain and means for increasing the gain of the control circuit means when the blowing means blows the air with a high air velocity and for decreasing the gain of the control circuit means when the air blowing means blows the air with a low air velocity, so as to control the response time of the control circuit means in accordance with the air velocity.

20. A temperature control unit for a vehicular air conditioning unit according to claim 19, wherein the control circuit means comprises a control loop including an amplifier with a feedback path, the feedback path having a variable time constant for controlling the variable gain of the loop.

* * * * *